United States Patent [19]

Marincic et al.

[11] 4,087,594
[45] May 2, 1978

[54] REACTIVATION OF PRIMARY ELECTROCHEMICAL CELLS

[75] Inventors: Nikola Marincic; Anthony Lombardi, both of Winchester, Mass.

[73] Assignee: GTE Laboratories, Incorporated, Waltham, Mass.

[21] Appl. No.: 779,303

[22] Filed: Mar. 21, 1977

[51] Int. Cl.² .............................................. H01M 6/38
[52] U.S. Cl. ..................................... 429/90; 429/116; 429/199
[58] Field of Search ........................... 429/116, 199, 90

[56] References Cited

U.S. PATENT DOCUMENTS

| | | | |
|---|---|---|---|
| 3,484,296 | 12/1969 | Buzzelli | 429/199 |
| 3,726,716 | 4/1973 | Athearn | 429/199 |
| 3,926,669 | 12/1975 | Auborn | 429/199 |

Primary Examiner—John H. Mack
Assistant Examiner—H. A. Feeley
Attorney, Agent, or Firm—Irving M. Kriegsman; Fred Fisher

[57] ABSTRACT

A primary electrochemical cell includes a device for reactivation of the cell after long periods of storage time. The device includes a movable diaphragm embedded in the cover portion which is coupled to an ampule having retained therein the activation material. The ampule is in close proximity with the anode and cathode elements immersed in the electrolyte and upon movement of the diaphragm the ampule is caused to release the reactivation material contained therein.

9 Claims, 3 Drawing Figures

U.S. Patent     May 2, 1978     4,087,594
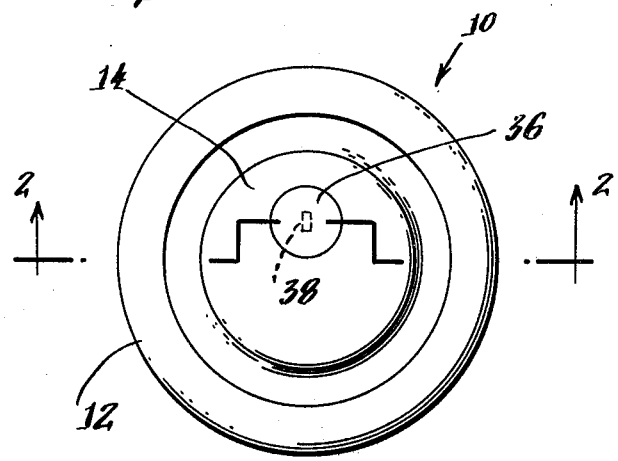
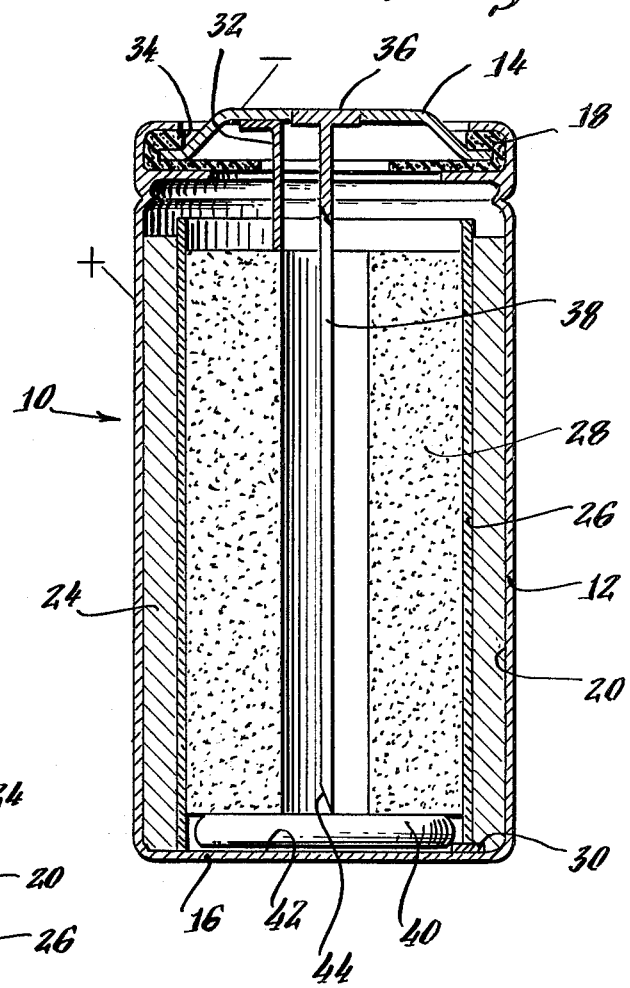
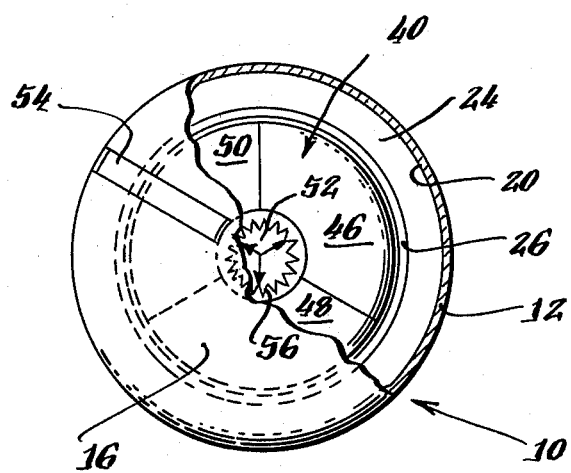

REACTIVATION OF PRIMARY ELECTROCHEMICAL CELLS

The invention herein described was made in the course of or under a contract or subcontract with the U.S. Army.

BACKGROUND OF THE INVENTION

The present invention relates to primary electrochemical cells and, in particular, relates to the reactivation of a primary electrochemical cell having an oxidizable active anode material; a cathode material selected from the group consisting of halogens and metal halides; an electrolytic solution between and in contact with the anode and cathode; and an ampule having a reactivation material contained therein immersed in the electrolyte.

Modern technology has placed increased emphasis on producing an electrochemical power source having improved reliability, light weight, small size, high power, and a relatively long or infinite shelf life. Power sources meeting these requirements find ready civilian and military applications in portable communication systems, in particular, systems which have short duty cycles, e.g., on for short periods of time and then kept inactive for very long periods of time.

Various high-voltage, high-energy density electrochemical cells have been the subject of recent investigations. Much of the work in this area has been involved with electrochemical cells having negative electrodes comprising highly reactive metals such as lithium. Work on electrolytes for lithium-based electrochemical power sources has progressed generally along two major lines: high temperature, inorganic molten salt electrolytes and organic solvent-based electrolytes. A cell which utilizes a molten salt electrolyte provides a chemically stable system in which strong oxidants such as chlorine can be used as cathodes. For example, a molten salt cell utilizing a lithium anode and chlorine cathode provides exceptionally high energy and power density making development of a practical cell with these materials of particular interest. The molten salt lithium/chlorine cell (having a lithium anode, chlorine cathode and molten salt, typically lithium chlorine, electrolyte) has many characteristics desirable in a high performance electrochemical cell. The anode is highly electropositive, the cathode is highly electronegative, the equivalent weight of the reaction production is low, and the anode, cathode and electrolyte conductivities are high.

In parallel with the development of lithium cells with molten salt electrolytes, lithium cells with nonhydroxylic organic solvents have been developed. These cells have been called "organic electrolyte cells", although typically they employ electrolytes consisting of inorganic salts in organic solvents. Cells of this type have the advantage of being operable at room temperature. However, chlorine itself and other strong oxidants can not be used as a cathode depolarizer with these solvents, since the solvents are oxidized by chlorine. Therefore, cells of this type will not provide an energy density as high as a lithium/chlorine cell.

In application Ser. No. 342,233, filed Mar. 16, 1973, now abandoned the continuation-in-part application of application Ser. No. 131,530, filed Apr. 5, 1971, both abandoned, there is described an electrochemical cell having an active anode material selected from a specified group of materials, including lithium, a halogen or metal halide cathode material, and an electrolyte containing phosphorous oxychloride as the solvent material and a solute, selected from a wide range of materials, dissolved in the phosphorous oxychloride. A further description of primary cells utilizing oxychloride or thionylhalide solvent is disclosed in U.S. Pat. No. 3,897,264, James A. Auborn on July 29, 1975.

SUMMARY OF THE INVENTION

This invention is directed to use with, although not limited to, electrochemical cells having an oxidizable active anode material, the cathode material selected from the group consisting of halogens and metal halides, and an electrolytic solution between and in contact with the anode and the cathode, the electrolytic solution comprising a lithium covalent inorganic thiohalide solvent and includes an ampule immersed in the solvent which is rupturable upon command to rejuvenate the primary cell.

As used throughout this specification and claims, when an electrochemical cell is designated to have a particular anode or cathode, or to have a particular anode or cathode material, that anode or cathode, or anode or cathode material, shall mean the electrochemically active component of the anode or cathode structure. Such a component may be in contact with or form a part of a suitable substrate which further defines the two anode and cathode structures.

Therefore, it is an object of the present invention to provide a reliable high energy primary cell which has a shelf life which is relatively long or effectively infinite, since it can be reactivated upon installation.

Another object of the present invention is to provide a reactivatable primary cell which may be stored for a prolonged period of time after being used for a short period of time.

It is a further object of the present invention to provide a primary electrochemical cell which may be reactivated a plurality of times after prolonged storage therebetween.

A primary electrochemical cell, according to the principles of the present invention, includes a case having an opening at one end, a cover disposed in the opening and adapted to cooperate therewith to provide a seal thereto, the cover including a movable diaphragm portion therein. An anode made of lithium, a cathode, and an electrolyte are disposed in the case, the electrolyte comprising a Lewis acid, a Lewis base and an inorganic solvent. Also, an ampule is disposed within the case in close proximity with the anode and cathode impervious to the electrolyte. A Lewis acid is in the ampule of sufficient quantity to dissove any film of Lewis base formed on the anode of the cell when the cell is not being discharged. In addition, incorporated within the outer case is an activating means, which is coupled between the ampule and the movable diaphragm portion. The activating means is adapted to release the Lewis acid in the ampule into the electrolyte upon movement of the movable diaphragm portion of the cover.

In order that the invention may be more fully understood, it will now be described, by way of example, with reference to the accompanying drawings.

BRIEF DESCRIPTION OF THE DRAWINGS

FIG. 1 is a top view of a battery, including the principles of the present invention;

FIG. 2 is a cross-section taken along the line 2—2 of FIG. 1;

FIG. 3 is a bottom plan view of an alternate embodiment of the present invention, partially broken away, disclosing a multi-compartment ampule and rotating means therefor.

DESCRIPTION OF THE PREFERRED EMBODIMENTS

Referring now to the drawings, and in particular to FIGS. 1 and 2, there is shown a primary electrochemical cell 10 constructed in accordance with the principles of the present invention. The cell 10 includes an outer case 12 in which the cell components are housed. The outer case 12 is commonly referred to as a "can". The operative terminals of the cell 10 are the cathode terminal 14 located centrally in the top of the can 12 with the anode terminal being the bottom surface 16 of the can 12. The cathode terminal 14 is separated from the outer case 12 by an insulating separator 18. The electrodes of primary cell 10 are located in the interior of the outer case 12. The electrodes in a lithium primary cell are generally spirally wound and are disposed in the space identified by the reference numeral 20. The structure of this portion of the primary cell includes an anode 24, an insulating separator sleeve 26, and a cathode 28. These electrodes are fully described in the aforementioned patent and applications, the subject matter thereof being incorporated herein by reference.

The anode 24 is preferably connected to the bottom 16 through a spot-welded connecting strip 30. Similarly, cathode 28 is connected to the external cathode terminal 14 through a wire 32. A more complete teaching of the internal structure of such a cell is found in U.S. Pat. No. 3,510,353 to McHenry, the teachings of which are also incorporated herein by reference.

The cathode terminal 14, when inserted in the open end 34 of the can 12, forms the seal to the can 12. The cathode terminal 14 may be referred to hereinafter as a cover and is provided with a movable diaphragm portion 36 which may be fabricated from any suitable flexible material such as polytetrafluoroethylene, soft glass or borosilicate glass. The movable diaphragm does not destroy the integrity of the seal formed by the cover (cathode) 14 since it is installed in the cover in a conventional manner, to maintain a seal although being adaptable to be moved or flexed when pressure is exerted thereon. Coupled to the diaphragm portion 36 is a rod-like member 38 which is adapted to extend almost to the opposite end of the outer case 12 proximate the anode terminal 16 where it is positioned in close proximity to an ampule 40 disposed along the innermost surface 42 of the can 12. Ampule 40 is made of a material inert to the electrolytic solution, such as polytetrafluoroethylene, soft glass or borosilicate glass. The rod-like member 38 is provided with a sharp point 44 on the end closest the ampule 40. The ampule 40 has contained therein a material which is known as a Lewis acid.

In operation, where it is desirable to reactivate the primary cell 10, pressure is exerted on the movable diaphragm portion 36, thus causing rod-like member 38 to pierce the ampule 40, releasing the Lewis acid into the electrolyte and causing a reaction with the anode 24.

The need for providing the additional acid in the cell, thereby rejuvenating it, may be explained by the discussion to follow. Generally, the electrolyte used for lithium inorganic batteries, as described hereinbefore, is prepared by dissolving equimolar quantities of lithium chloride (LiCl) and aluminum chloride (AlCl$_3$) in pure thionyl chloride (SOCl$_2$). The aluminum chloride, being a typical Lewis acid, is combined with the lithium chloride (LiCl) which is a Lewis base forming a double salt in LiAlCl$_4$ that dissociates in the thionyl coride solution rendering the solution conductive. Lithium cells made with such electrolyte tend to passivate on storage at elevated temperatures, due to the build up of the lithium chloride (LiCl) film on the anode surface. The film must be removed from the surface by a slow discharge before the cell may be made capable of delivering high currents. Depending on the extent of the passivation provided, this activation at a low discharge rate may be required to last for several minutes or longer.

After a careful investigation, applicants have discovered that a passivated cell could be reactivated by supplying excess Lewis acid to the electrolyte, mainly excessive amounts of aluminum chloride (AlCl) that would dissolve the passivated film of lithium chloride (LiCl) off the anode surface and restore the surface to the original active state. This may be repeated many times, and may be done each time the battery has been stored on the shelf or kept inactive for long periods of time. The construction of the cell shown in FIG. 2 is a preferred way of introducing the Lewis acid into the electrolyte. An extra amount of solid aluminum chloride (AlCl$_3$) or of a concentrated solution of aluminum chloride or any other Lewis acid in thionyl chloride (SOCl$_2$) is stored in the ampule 40 which is placed at the bottom of the cell 10. The activating mechanism as presently described requires pressure on the movable diaphragm 36. This may be accomplished by manual means or providing an electrically activated device such as a solenoid, not shown. The Lewis acid from the ampule may be released either immediately before or several days prior to the date the cell is to be put into service. The Lewis acid, depending on its relative quantity released, will dissolve the passivating layer and also etch the anode surface until enough lithium chloride (LiCl) is produced to completely neutralize the acid present. Such a reactivated cell will then show all the rate characteristics of a fresh cell, since all the effects of storage are erased from the anode surface.

In an alternate embodiment, shown in FIG. 3, the ampule 40 is provided with a plurality of compartments 46, 48 and 50, each of which contains various concentrations of the Lewis acid. Means are provided, such as a knob 52, which may be used to rotate the ampule 40, thereby positioning a different compartment under the rod-like member 38. Thus, any one of a plurality of compartments may be activated on command, supplying various concentrations of Lewis acid to the electrolyte depending upon the amount of storage time the cell 10 has experienced. A stripe 54, or other suitable indicia, may be placed on the bottom surface (anode) of the outer case 12 which, when in line with the arrow 56, or other suitable indicia, indicates which compartment is in the process of being activated when the movable diaphragm portion is depressed.

Hereinbefore has been disclosed a lithium/thionyl chloride battery of high reliability and relatively large or infinite shelf life, which may be reactivated prior to use, yielding performance equal to a substantially fresh or newly made cell.

It will be understood that various changes in the details, materials, arrangement or parts and operating conditions which have been herein described and illustrated in order to explain the nature of the invention may be made by those skilled in the art within the scope of the present invention.

What is claimed is:

1. A primary electrochemical cell comprising:
   a. a case having an opening at one end;
   b. a cover disposed in said opening and adapted to cooperate therewith to provide a seal thereto, said cover including a movable diaphragm portion therein;
   c. an anode, said anode being made of lithium;
   d. a cathode;
   e. an electrolyte, said anode, cathode and electrolyte being disposed in said case, said electrolyte comprising a Lewis acid, a Lewis base and an inorganic solvent;
   f. an ampule disposed within said case in close proximity with said anode and cathode, impervious to said electrolyte;
   g. a quantity of a Lewis acid in said ampule, said quantity being sufficient to dissolve any film of Lewis base formed on the anode of the cell when said cell is not being discharged; and
   h. activating means coupled between said ampule and said movable diaphragm portion, said activating means releasing said Lewis acid in said ampule into said electrolyte by moving said cover movable diaphragm portion.

2. A primary cell according to claim 1 wherein said activating means includes means for rupturing said ampule and causing said Lewis acid to be released into said electrolyte.

3. A primary cell according to claim 2 wherein said ampule is made essentially from polytetrafluoroethylene.

4. A primary cell according to claim 2 wherein said ampule is made essentially from glass.

5. A primary cell according to claim 2 wherein said means for rupturing said ampule comprises a rod-like member coupled to said movable member on one end thereof, the other end of said rod-like member being provided with a point for piercing said ampule upon depression of said movable diaphragm portion.

6. A primary cell according to claim 1 wherein said ampule has a plurality of compartments, each compartment being rotatable into position to be individually activated.

7. A primary cell accordng to claim 5 further including means for indicating the compartment activated.

8. A primary cell according to claim 1 wherein the material in the ampule is essentially aluminum chloride ($AlCl_3$).

9. A primary cell according to claim 1 and wherein the Lewis acid in the ampule is the same Lewis acid as is in the electrolyte.

* * * * *